United States Patent [19]

Inoue et al.

[11] 4,355,223
[45] Oct. 19, 1982

[54] ELECTROEROSION METHOD AND SYSTEM FOR TAPER CUTTING WITH TRAVELLING WIRE ELECTRODE

[75] Inventors: Kiyoshi Inoue, Tokyo; Iwao Shibuya, Kawasaki, both of Japan

[73] Assignee: Inoue-Japax Research Inc., Yokohama, Japan

[21] Appl. No.: 151,723

[22] Filed: May 20, 1980

Related U.S. Application Data

[63] Continuation of Ser. No. 897,419, Apr. 18, 1978, abandoned.

[30] Foreign Application Priority Data

Apr. 25, 1977 [JP] Japan ................................ 52-46761

[51] Int. Cl.³ ............................................. B23P 1/12
[52] U.S. Cl. ............................. 219/69 M; 219/69 W
[58] Field of Search ......................... 219/69 M, 69 W

[56] References Cited

U.S. PATENT DOCUMENTS

| | | |
|---|---|---|
| 3,002,115 | 9/1961 | Johnson et al. |
| 3,069,608 | 12/1962 | Forrester et al. |
| 3,530,283 | 9/1970 | McDaniel. |
| 3,731,043 | 5/1973 | Ullmann et al. ................ 219/69 W |
| 3,731,044 | 5/1973 | Ullmann et al. ................ 219/69 W |
| 3,731,045 | 5/1973 | Ullmann et al. ................ 219/69 W |
| 3,849,624 | 11/1974 | Dulebohn et al. .............. 219/69 W |
| 4,123,645 | 10/1978 | Shichida et al. ............... 219/69 W |

FOREIGN PATENT DOCUMENTS 504466 4/1976 U.S.S.R. ......................... 219/69 W

*Primary Examiner*—C. C. Shaw
*Attorney, Agent, or Firm*—Karl F. Ross

[57] ABSTRACT

A numerical control system and method for controlling a travelling-wire EDM system in which the pulses from the numerical controller are transmitted to pulse motors driving the workpiece table along X and Y axes for generating the shape to be machined in the workpiece. A taper is applied to the cut by mounting one of the electrode wire guides on a support capable of x and y movements through respective pulse distributors and sign-changing inverters from the numerical controller with respective pulse motors so that the cut on one side of the workpiece represents the sum of increments from both the X-Y and x-y placements while the cut on the opposite side represents substantially only the increments of the X-Y displacements.

11 Claims, 8 Drawing Figures

ELECTROEROSION METHOD AND SYSTEM FOR TAPER CUTTING WITH TRAVELLING WIRE ELECTRODE

This is a continuation of application Ser. No. 897,419, filed Apr. 18, 1978, now abandoned.

The present invention relates to an electroerosion method and system for taper-cutting an electrically conductive workpiece with a travelling-wire-type machining electrode.

BACKGROUND OF THE INVENTION

In the art of electroerosion with wire type electrode, which is commonly called "wire-cut EDM (electrical discharge machining)" or "travelling-wire EDM", a wire or like elongated body, which is continually fed or caused to travel through a machining zone in which a workpiece is positioned upon a worktable, is supported under tension between a pair of guides disposed at opposite sides with respect to the workpiece while a series of electrical pulses are applied between the workpiece and the wire which constitutes a machining electrode to effect time-spaced electrical discharges between them. The machining zone is flushed with machining fluid which is typically a distilled water and material is removed from the workpiece by the electroerosion action. As material removal or machining proceeds, the worktable carrying the workpiece is displaced transversely to the direction of travel of the workpiece by control signals delivered from a control unit that is typically a numerical controller in which a predetermined cutting path is memorized. In usual applications, the wire electrode travel extends perpendicularly to the direction of such displacement of the workpiece relative to it so that a straight cut with a predetermined pattern is produced in the workpiece.

It is sometimes desirable to obtain a tapered cut in a workpiece, for example, when the latter is to be a mold or die with a tapered edge. In one conventional process, one of the guides which support the wire electrode at opposite sides with respect to the workpiece is caused to continually move along a circle having a radius predetermined in conjunction with the angle of a taper desired. In another known process, the wire electrode is caused to travel under numerical control in a path normal to the direction of advance of machining along a predetermined circular orbit with a predetermined slope.

Both of these processes have disadvantages. The first technique entails excessive amount of material removal because of a frustoconical cutting that ensues and is hence time-consuming and ineffective. Further, corner portions become rounded and consequently inaccurate. Besides, this technique is only applicable with practicability to thin workpieces and small tapers. In the latter process as well, corner portions become rounded. Thus, during the time in which the rotary table which carries one of the wire-supporting guides along the predetermined circular orbit is rotated in order to cause the wire electrode to be oriented normal to the direction of advance in the next machining block or section, the worktable which carries the workpiece for contour-machining under numerical control must be kept stationary. This brings about over-cutting of the workpiece portion which is located on the side of the fixed electrode-supporting guide with the result of deterioration of machining accuracy.

OBJECT OF THE INVENTION

It is therefore an object of the present invention to provide a method of and a system for electroerosion for taper cutting under numerical control with a travelling-wire electrode which permit taper cutting to be executed over high efficiency with a wide range of taper angles and without deteriorating machining accuracy, thus an accuracy which is substantially the same as that in straight or non-taper cutting.

SUMMARY OF THE INVENTION

The method according to the invention employs, in addition to usual contouring feed means for displacing a workpiece relative to a travelling wire electrode in X and Y two coordinates along a predetermined cutting path, means for displacing one of the guides which support the wire electrode in x and y coordinates and means for causing said one of electrode-supporting guides to be displaced proportionally to the contour-machining displacement for each contour-machining block.

In carrying out the method according to the invention, components to be incorporated additionally to usual or non-taper cutting numerical control information only include a pulse distributory ratio representing the ratio between the machining feed displacement and the electrode-supporting guide displacement and a component describing the direction of the electrode displacement, and the control signal for the guide displacement can, therefore, readily be derived from the relative magnitudes between the machining feed displacement and the electrode guide displacement, the plus/minus signs of these displacements and the ratio between the displacements.

Thus, the invention provides an electroerosion method under numerical control for taper-cutting an electrically conductive workpiece with a wire type electrode, said wire type electrode travelling axially in the region of the workpiece and being supported under tension between a pair of guide members disposed on opposite sides with respect to the workpiece, at least one of said guide members being movable transversely to said travelling-wire electrode. The method comprises effecting a contour-machining feed of the workpiece relative to said travelling wire electrode with machining feed pulses so as to relatively displace the workpiece and the wire electrode in a plane along X and Y coordinates or axes over a prescribed path under numerical control based upon recorded information describing said path, effecting displacement of said movable guide member with guide feed pulses along x and y axes with a predetermined inclination relative to an axis normal to said plane, and adding to said recorded information of the numerical control and for each recorded information block, information (1) representing a distributory pulse ratio between said machining feed pulses for said contour-machining feed and guide feed pulses for said displacement of the movable guide member and information (2) representing the plus or minus sign indicative of the advance of the movable guide member so as to controllingly effect the X-Y machining feed and the x-y guide displacement simultaneously.

The system according to the invention includes means for effecting a contour-machining feed of the workpiece relative to the travelling wire electrode with machining feed pulses so as to effect the relative displacement of the workpiece to the travelling wire electrode in a plane comprised of X and Y axes along a prescribed path under numerical control based upon a record information (recorded information) describing said path, guide feed means for effecting displacement of said movable guide member with guide feed pulses along x and y axes with a predetermined inclination relative to an axis normal to the plane, and means for adding to said recorded information for the numerical control and for each record information block information (1) representing a distributory pulse ratio between said machining feed pulses to be delivered to said machining feed means and guide feed pulses to be delivered to said guide feed means and information (2) representing the plus or minus sign indicative of the advance of said movable guide member so as to operate the X-Y machining feed means and the x-y guide feed means simultaneously.

Specifically, the contour-machining feed means may include a work or main table for carrying the workpiece and incrementally displaced along X and Y axes by X-axis and Y-axis pulse motors, respectively. Likewise, the guide feed means may include a support or subsidiary table for supporting said movable guide member and displaced incrementally along x and y axes by x-axis and y-axis pulse motors. The adding means may be associated with sets of pulse distributers and sign changers controlled by a numerical controller storing the record information as well as the information units (1) and (2) for providing the X-axis, Y-axis, x-axis and y-axis motors, respectively, with X-axis, Y-axis, x-axis and y-axis components of said machining feed pulses and guide feed pulses to displace said main and subsidiary tables accordingly.

BRIEF DESCRIPTION OF THE DRAWING

The invention will now be described, by way of example, with reference to the accompanying drawing in which.

SPECIFIC DESCRIPTION

Figure 1:
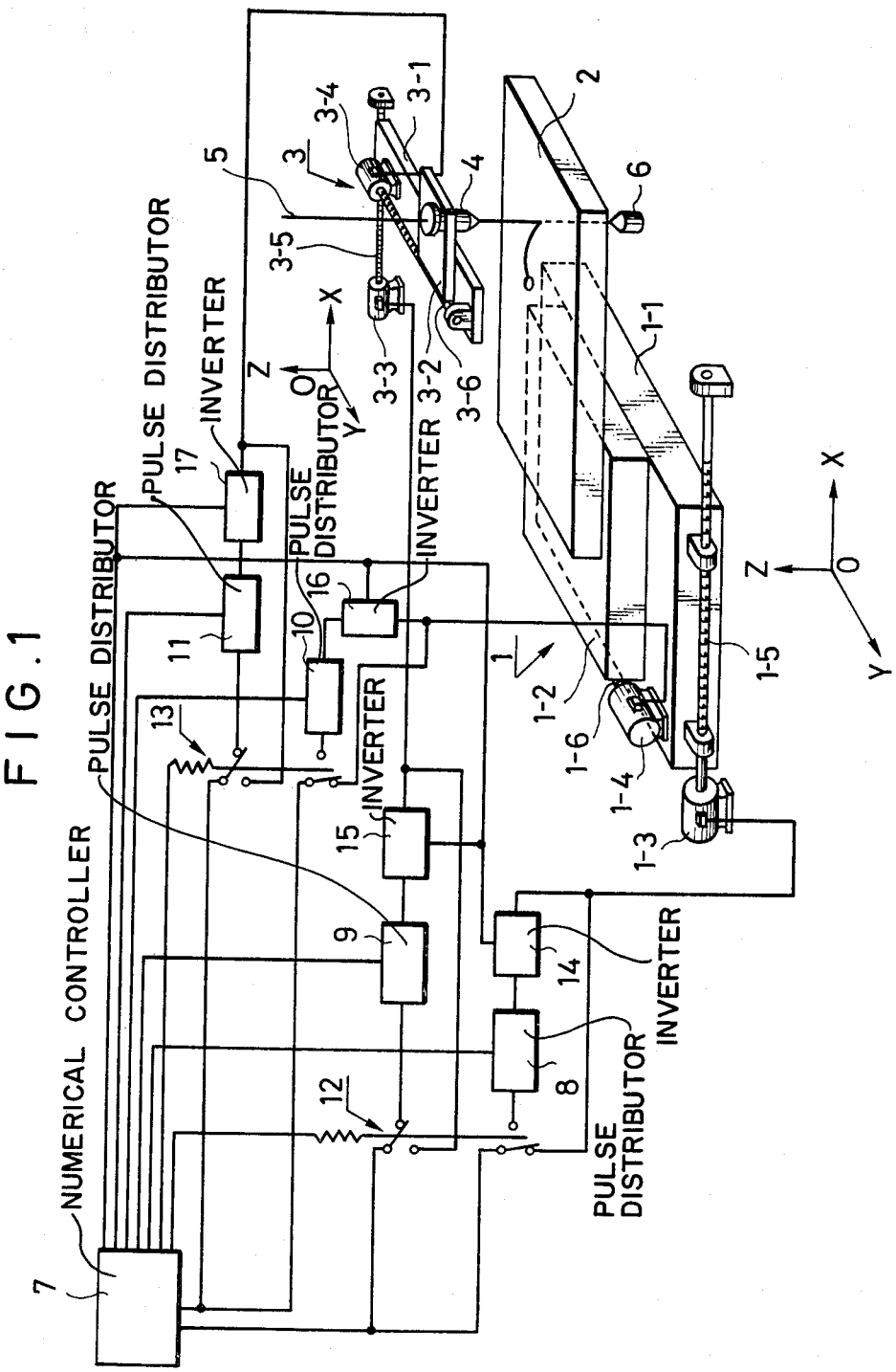
FIG. 1 is an overall view, in part in perspective and in part as a circuit diagram, illustrating principal components of a travelling-wire electroerosion machine embodying the method and system according to the present invention.

An embodiment of the invention shown in FIG. 1 includes a main cross-table 1 which carries a workpiece 2 securely mounted thereon and is displaced for contour-machining of the workpiece 2. A subsidiary cross-table 3 has a movable guide 4 for supporting a travelling-wire electrode 5 which is also supported by a fixed guide 6 disposed on the opposite side to that of the movable guide 4 with respect to the workpiece 2. The main cross-table 1 comprises an X-axis table 1-1 displaced in the X coordinate, a Y-axis table 1-2 displaced in the Y coordinate, an X-axis pulse motor 1-3 which incrementally displaces the table 1-1 along the X-axis, a Y-axis pulse motor 1-4 which incrementally displaces the table 1-2 along the Y-axis, and lead screws 1-5 and 1-6 in the known manner. The subsidiary cross-table 3 comprises an x-axis table 3-1 displaced in the x coordinate, a y-axis table 3-2 displaced in the y coordinate, an x-axis pulse motor 3-3 which incrementally displaces the table 3-1 along the x-axis, y-axis pulse motor 3-4 which incrementally displaces the table 3-2 along the y-axis, and lead screws 3-5 and 3-6. Preferably, the X-axis and the x-axis are arranged in parallel to each other and the Y-axis and the y-axis are likewise arranged. In accordance with an important aspect of the invention, the displacement of one of the main table 1 and the subtable 3 is controlled so as to be effected proportionally to the displacement of the other.

In order for such displacements to be effected, the motors 1-3, 1-4 for X-axis and Y-axis tables 1-1, 1-2 and the motors 3-3, 3-4 for x-axis and y-axis tables 3-3, 3-4 are controlled by output signals delivered from a numerical controller 7 via pulse distributers 8 to 11, switches 12 and 13 and sign changers 14 to 17. While the switches 12 and 13 are shown by a mechanical-contact symbol, they preferably are constituted by IC (integrated circuit) elements. The wire electrode 5 is bridged and stretched between the guides 4 and 6 and, when as in usual cases a straight cutting is carried out, is held so as to extend in the direction of the Z-axis which is normal to the X-Y plane in which machining feed is effected. Machining feed pulses are then directly applied to pulse motors 1-3 and 1-4 for the main table 1 from the numerical controller 7 with the pulse distributers 8 and 10 being disconnected therefrom by the switches 12 and 13 as shown. This causes the main cross-table 1 to be displaced to feed the workpiece 2 along a programmed cutting path to impart thereto a desired contour determined by said path while a series of electrical machining pulses are passed between the workpiece 2 and the wire electrode 4 from an electroerosion power supply (not shown) in the presence of a machining fluid supplied from a supply source (not shown) to the machining gap.

Figure 2:
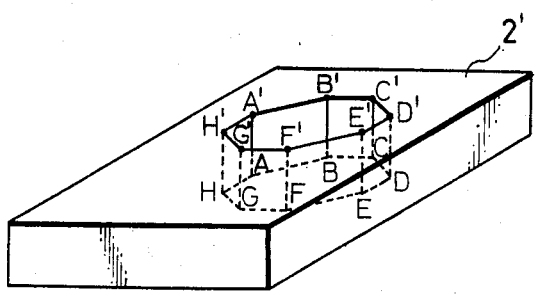
FIGS. 2 and 3 are general perspective and plan views, respectively, illustrating a taper-cutting example.
Figure 3:
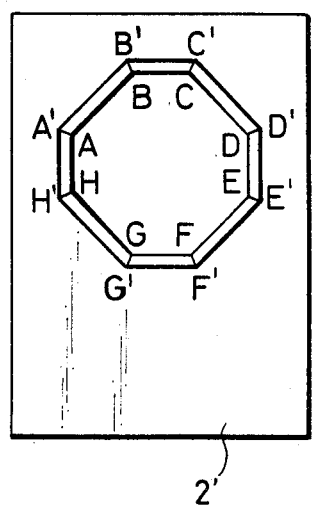

When taper cutting as shown in FIGS. 2 and 3 is performed to produce a contoured die 2' with a desired taper defined by a lower contour ABCDEFGHA and an upper contour A'B'C'D'E'F'G'H'A', the subsidiary cross-table 3 is operated to displace the movable guide 4 for the wire electrode 5 and additionally to the operation of the main table 1 described in the preceding paragraph.

In accordance with the present invention, this additional operation is effected by establishing a proportional constant or ratio for each numerical record information block in the numerical controller 7 and causing the movable guide 4 to be displaced by a distance proportional to a distance of the machining feed of the workpiece 2. Thus, the NC command information incorporates a normal or basic command information plus a control information for the subsidiary table required for each machining information block.

Figure 4:
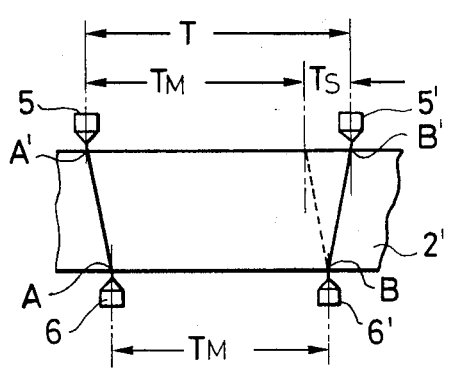
FIG. 4 is an elevational view diagrammatically illustrating said example being processed according to the invention.

With reference to FIG. 4 showing a rectilinear tapered contour-machining surface AA'B'B of FIGS. 2 and 3, the contents of the control information for the subsidiary cross-table 3 will be described. In this machining block, the wire electrode 5 located initially at AA' is displaced so as to position at BB' at the end of the same block. AA' represents the line of intersection between the plane AA'B'B and the plane HH'A'A located to its left while BB' represents the line of intersection between the plane AA'B'B and the plane BB'C'C located to its right. In the execution of this machining block, the fixed guide 6 for the wire electrode 5 is displaced relatively to the workpiece 2' so as to locate at the position shown by the numeral 6' at the end of the same machining block while the movable guide 3 is shifted from the position 5 to the position 5'. The displacement TM of the former is given solely by the operation of the main cross-table 1 whereas the displacement T of the guide 3 represents the algebraic sum of TM and TS, the latter being the displacement fed by the subsidiary cross table 3. With the machining information block (group of information for each machining step) here being a linear interpolation block, the computation of the magnitude and the sign of the displacement TS is made readily from the taper to be obtained and the respective angles of HA and BC with respect to AB.

In accordance with the present invention, the following parameters are utilized for control of the subsidiary cross-table 3:

(I) the sign of TS (plus or minus)
(II) whether, TM or TS is greater and
(III) TS/TM when TM>TS
TM/TS when TS>TM where it is assumed that TS>0 and TM>>TS.

Referring back to FIG. 1, assume that the switches 12 and 13 are positioned as shown, the pulse motors 1-3 and 1-4 for the main cross-table 1 receiving from the numerical controller 7 pulses distributed in X and Y coordinates to effect displacement from A to B. On the other hand, the pulse motors 3-3 and 3-4 for the subsidiary cross-table 3 are supplied with pulses scaled down to TS/TM by the distributers, i.e. pulse distributors, 9 and 11 from pulses for displacement of the main cross-table 1. Thus, when the main cross-table 1 has completed displacement from A to B, there results the simultaneous completion by the subsidiary cross-table 3 of displacement TM+TS, ready to shift to the next cutting block BB'-CC'.

Assuming that machining feed is effected from A to B by the main cross-table 1 with X=XM and Y=YM and at the same time the guide 4 is shifted from A' to B' by the cross-table 3 with x=x$_s$ and y=y$_s$ and the line AB having an angle $\theta$ with respect to the X-axis, the following formulas are given:

$$XM = TM \cos \theta$$

$$YM = TM \sin \theta$$

$$x_s = TS \cos \theta$$

$$y_s = TS \sin \theta$$

Thus, $$TS/TM = x_s/XM = y_s/YM \quad (1)$$

Accordingly, the displacement of the guide 4 in x and y coordinates:

$$x_s = \frac{TS}{TM} XM \quad (2)$$

$$y_s = \frac{TS}{TM} YM \quad (3)$$

and by making a unit of distance by which the main cross-table 1 is displaced by the pulse motor 1-3, 1-4 with a single incoming pulse identical to that by which the subsidiary cross-table 3 is displaced by the pulse motor 3-3, 3-4 with the same pulse, a desired displacement is achieved with the corresponding number of pulses.

Thus, by computing TS/TM for each machining information block of a series of rectilinear interpolation sections, the pulse distributory ratio in each of the distributors 9 and 11 are readily determined for each individual block.

While in the foregoing an explanation has been given with regard to the rectilinear interpolation machining section, the discussion identically applies to a circular arc interpolation section smoothly connecting to a rectilinear section or another circular interpolation section as well.

Figure 6:
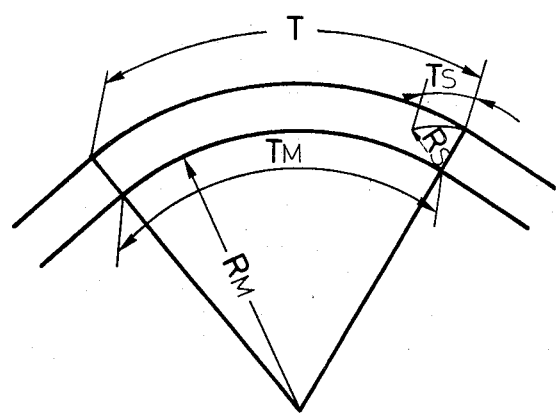

Thus, as shown in FIG. 6, while the main cross-table 1 is performing a circular arc interpolation operation TM, the subsidiary table assembly 3 may be supplied with pulses scaled down to TS/TM(=RS/RM) by distributers 8 through 11 from pulses delivered for displacement of the cross-table 1 through X and Y axes. In this case, no particular operation is required at the junction with the subsequent machining block to achieve a desired taper cutting. An exception is the case in which rectilinear and circular interpolation sections are discontinuous with each other at their junctions, thus requiring corrections of the electrode inclination angle. In that case as well, however, a similar processing is attained with the distributory ratio set at 0 or 1.

Figure 7:
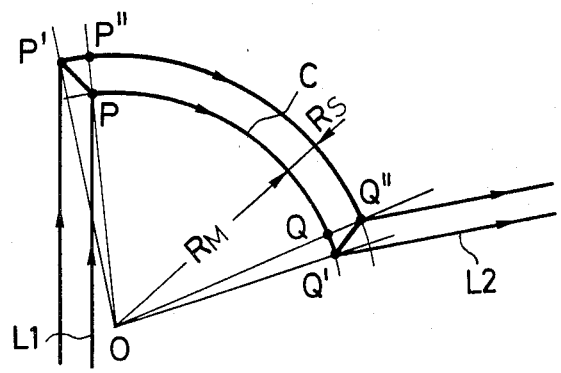

FIG. 7 shows an example in which the contouring path comprises a rectilineal-point-rectilineal path L1-0-L2 and in which the main table 1 reaches the point P, the subsidiary table is reached to the point P'. In order to process this example, the position of the switches is reversed. This permits table feed pulses from the numerical controller 7 to be applied to the motors 3-3 and 3-4 for the subsidiary table 3. Since the main table 1 is then not permitted to displace, the ratio information in pulse distributers 8 through 11 may be set at "0", thus allowing the desired operation to be performed with ease. Likewise, in order to enable a shift from 0 to the next rectilineal L2, the main table 1 alone may be allowed to be displaced on the circular arc QQ' while the subsidiary table 3 needs to remain stationary at the point Q". This can be accomplished by causing the subsidiary table 3 to assume displacement just opposite to that of the main table 1 upon the latter having completed the shift Q-Q'. Thus, with the position of the switches 12 and 13 in FIG. 1 as shown, the ratio information in pulse distributers 8 through 11 may be set at "1" and the sign changers 14 through 17 reversed.

Figure 5:
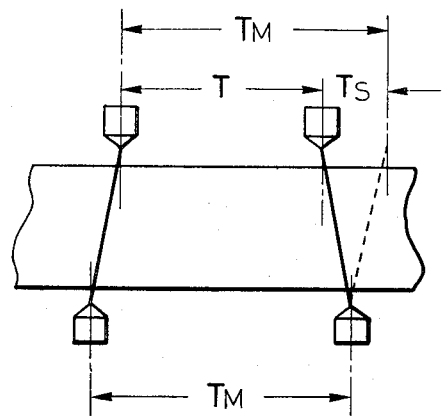
FIGS. 5 to 8 illustrate diagrammatically other machining examples with sections and surfaces, FIGS. 5 plus 8 and FIGS. 6 plus 7 being elevational and plan views, respectively, thereof.

FIG. 5 shows an example in which TS<0 in contrast to those described hereinbefore and thus in which taper cutting with a reverse taper is to be performed. This can simply be achieved by setting the pulse distributory ratio in the pulse distributers 9 and 11 equal to |TS/TM| and reversing the rotary direction of the pulse motors 1-3 and 3-3 as well as the pulse motors 1-4 and 3-4 to each other by means of the sign changers 14 and 15.

Figure 8:
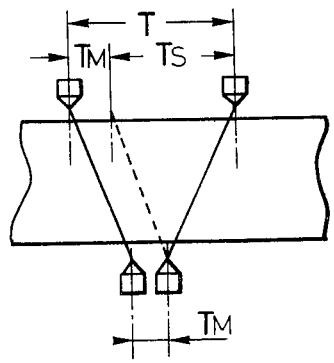

While the relationship TM<<TS applies in a very short machining section as shown in FIG. 8. In this instance, the switches 12 and 13 may simply be reversed from the position shown to cause table feed pulses from the numerical controller 7 to be delivered to the motors 3-3 and 3-4 for the sub-table 3 and table feed pulses distributed at the pulse distributers 8 and 10 to be delivered to the motors 1-3 and 1-4 for the main table 1. As is evident, here, table feed pulses delivered to the sub-table assembly 3 from the numerical controller 7 do not represent absolute distance T but rather represents distance TS. The absolute distance T(=TS+TM) is obtained by algebraic summation of TS and TM, the latter being displacement of the main table proportionally distributed at |TM/TS|.

Although in FIG. 4 and in the foregoing, the movable guide 5 and the fixed guide 6 are shown and described located at or proximate the upper and lower surfaces of the workpiece 2, respectively, they are actually to be disposed at a distance from these surfaces with simple corrections made of the machining feed and guide feed command information. Such corrections are obvious and accordingly further explanation is here omitted.

There is thus provided an improved electroerosion method and system for taper cutting with a travelling wire electrode whereby through the simple modification of a conventional numerical control record information a desired cutting operation can be performed with ease and with a high precision throughout the entire machining zone including corner and ridge portions which have hitherto been only machinable at the sacrifice of precision.

We claim:

1. An electroerosion method for taper-cutting an electrically conductive workpiece with a wire electrode, said wire electrode travelling axially through the workpiece and being supported under tension between a pair of guide members disposed on opposite sides of the workpiece, at least one of said guide members being movable transversely to said travelling wire electrode, said method comprising the steps of:

effecting a contour-machining feed of said workpiece relative to said travelling wire electrode with machining feed pulses so as to effect the relative displacement of the workpiece to the wire electrode in a plane comprised of X and Y axes along a prescribed path under numerical control based upon stored information describing said path;

effecting displacement of said at least one movable guide member with guide feed pulses along x and y axes with a predetermined angle of inclination to a direction normal to said plane; and adding to said stored information of the numerical control for each portion of said path information (1) representing a pulse ratio between said machining feed pulses for said contour-machining feed and guide feed pulses for said displacement of the at least one movable guide member and information (2) representing the plus or minus sign indicative of the direction of advance of said at least one movable guide member so as to conrollingly effect X-Y axes contour-machining feed and x-y axes displacement of the at least one movable guide member simultaneously and thereby taper-cut the workpiece.

2. The method defined in claim 1 wherein the X-axis and the x-axis are parallel to each other and the Y-axis and the y-axis are parallel to each other.

3. The method defined in claim 1 wherein the workpiece and the guide member are displaced proportionally to each other.

4. An electroerosion system for taper-cutting an electrically conductive workpiece with a wire electrode, said wire electrode travelling axially through the workpiece and being supported under tension between a pair of guide members disposed on opposite sides of the workpiece, at least one of said guide members being movable transversely to said travelling wire electrode, said system comprising:

means for effecting a contour-machining feed of said workpiece relative to said travelling wire electrode with machining feed pulses so as to effect the relative displacement of the workpiece to the wire electrode in a plane comprised of X and Y axes along a prescribed path under numerical control based upon stored information describing said path;

guide feed means for effecting displacement of said at least one movable guide member with guide feed pulses along x and y axes with a predetermined angle of inclination to a direction normal to said plane; and means for adding to said stored information of the numerical control for each portion of said path information (1) representing a pulse ratio between said machining feed pulses to be delivered to said machining feed means and guide feed pulses to be delivered to said guide feed means and information (2) representing the plus or minus sign indicative of the direction of advance of said at least one movable guide member so as to controllingly operate simultaneously said X-Y axes machining feed means and said x-y axes guide feed means and thereby taper-cut the workpiece.

5. The system defined in claim 4 wherein said contour-machining feed means comprises a work or main table for carrying the workpiece, said work or main table being incrementally displaceable along X and Y axes.

6. The system defined in claim 5 wherein said work or main table is displaceable by means of X-axis and Y-axis pulse motors.

7. The system defined in claim 4, claim 5 or claim 6 wherein said guide feed means comprise a support or subsidiary table for supporting said at least one movable guide member, said support or subsidiary table being incrementally displaceable along x and y axes.

8. The system defined in claim 7 wherein said support or subsidiary table is displaceable by means of x-axis and y-axis pulse motors.

9. The system defined in claim 4 wherein said contour-machining feed means comprises a work or main table for carrying the workpiece and said guide feed means comprises a support or subsidiary table for supporting said at least one movable guide member, said work or main table being incrementally displaceable along X and Y axes by means of X-axis and Y-axis pulse motors, said support or subsidiary table being incrementally displaceable along x and y axes by means of x-axis and y-axis pulse motors and wherein said adding means is associated with sets of pulse distributors and sign changers controlled by a numerical controller, forming part of the system, storing said stored information and said information (1) and said information (2) for providing said X-axis, Y-axis, x-axis and y-axis motors, respectively, with X-axis, Y-axis, x-axis and y-axis components of said machining feed pulses and guide feed pulses to displace said main and subsidiary tables accordingly.

10. The system defined in claim 9 wherein said X-axis and said x-axis are arranged parallel to each other and said Y-axis and said y-axis are parallel to each other.

11. The system defined in claim 10, further comprising means for controlling the displacement of one of the contour-machining feed means and the guide feed means so as to be effected proportionally to the displacement of the other.

* * * * *

UNITED STATES PATENT AND TRADEMARK OFFICE
CERTIFICATE OF CORRECTION

PATENT NO. : 4,355,223

DATED : 19 October 1982

INVENTOR(S) : Kiyoshi Inoue

It is certified that error appears in the above-identified patent and that said Letters Patent is hereby corrected as shown below:

In the heading page, under Assignee, read:

-- Inoue Japax Research Inc., Yokohamashi, Japan and Japax Inc., Kawasakishi, Japan --

Signed and Sealed this

Twentieth Day of June, 1989

Attest:

DONALD J. QUIGG

*Attesting Officer*  *Commissioner of Patents and Trademarks*